Patented Mar. 15, 1932

1,850,017

UNITED STATES PATENT OFFICE

HANS LEHRECKE, OF FRANKFORT-ON-THE-MAIN, GERMANY

PROCESS FOR THE SEPARATE RECOVERY OF ALUMINIUM AND PHOSPHORIC ACID FROM SUBSTANCES CONTAINING THESE CONSTITUENTS

No Drawing. Application filed February 20, 1929, Serial No. 341,558, and in Germany November 19, 1928.

This invention relates to a process for the separate recovery of aluminium and phosphoric acid from substances containing these constituents, said process being characterized by the feature that the aluminium is separated from the phosphoric acid in solutions containing, for example, aluminium in the form of any convenient salt, and free phosphoric acid or a soluble phosphate, with the aid of alkali-fluorine compounds. Hitherto, such separation has presented very considerable difficulties. Attempts have been made, for example, to separate the aluminium from the phosphoric acid in such solutions by precipitation, for example with ammonia. It has, however, been found that, in such case, there is always formed, in addition to aluminium hydroxide and a solution of ammonium phosphate, a large proportion of insoluble aluminium phosphate which renders the separation impracticable.

According to the present invention, the separation of the aluminium from the phosphoric acid in solutions containing an aluminium salt and phosphoric acid, or phosphates, is effected without any difficulty, by precipitating the aluminium in the form of a double fluoride, such as sodium-aluminium fluoride (similar to cryolite), the precipitation of the aluminium being complete, without any phosphoric acid coming down in the precipitate.

In carrying out the invention, the following working methods may be employed:

1. A solution of an aluminium salt, such as the sulphate, and phosphoric acid, is treated, for example at ordinary or elevated temperature, with such an amount of sodium fluoride—either in solid form or as a saturated solution—as to make the proportions 6 or more molecules of NaF to each atom of aluminium. The precipitated aluminum-sodium fluoride can be easily filtered off. The filtrate retains the whole of the phosphoric acid and the sodium salt of the acid which was combined with the aluminium.

With solution of (for example) aluminium sulphate and phosphoric acid, the reaction proceeds as follows:

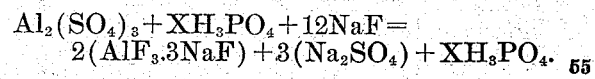
$$Al_2(SO_4)_3 + XH_3PO_4 + 12NaF = 2(AlF_3.3NaF) + 3(Na_2SO_4) + XH_3PO_4.$$

2. Alternatively, the solution is treated with such an amount of a sodium salt, for example sodium chloride as to make the proportions 6 or more molecules of sodium chloride to each molecule of the aluminium salt. The, preferably heated, solution is then treated with such an amount of a solution of hydrofluoric acid as is at least sufficient to convert the aluminium salt present into $AlF_3.3NaF$. The reaction proceeds in accordance with the equation:

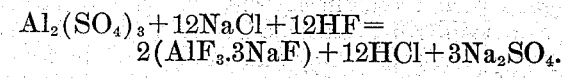
$$Al_2(SO_4)_3 + 12NaCl + 12HF = 2(AlF_3.3NaF) + 12HCl + 3Na_2SO_4.$$

3. If the aluminium be originally present as fluoride in the solution, it is advisable to treat the solution with only such an amount of solid or dissolved sodium fluoride as corresponds to the molecular ratio 3 mol. NaF to 1 mol. $AlF_3$. An excess of sodium fluoride renders the precipitation of the aluminium-sodium fluoride more rapid.

The possibility, afforded by the hereindescribed process, of completely precipitating aluminium in the form of a solid compound from solutions containing phosphoric acid or phosphates, acquires its special technical importance from the fact that, by this means, the abundant native deposits of aluminiferous phosphates can be treated for the recovery of their valuable constituents, alumina and phosphoric acid, which was hitherto impracticable. Moreover, such phosphates could not be transformed into fertilizers, because the subsequent formation of insoluble compounds between the aluminium and the phosphoric acid renders the dissociation nugatory.

In treating such native aluminiferous phosphates for the recovery of alumina and phosphoric acid in accordance with the invention, the following procedure may be adopted:

(a) The raw material is dissociated with a mineral acid, such as sulphuric acid. This results in the formation of a solution of an aluminium salt, such as sulphate, and phosphoric acid, which solution is separated from the insoluble residue by filtration. From this solution, the aluminium can be precipitated, as aluminium-sodium fluoride, in the above-described manner, by the addition of a corresponding amount of either sodium fluoride or of sodium chloride and hydrofluoric acid. The double fluoride is separated from the phosphoric acid by, for example, any known technical filtration of decantation method. If hydrochloric acid be employed for the dissociation of the raw phosphate, it is advisable before precipitating the aluminium, to eliminate any calcium (for example from calcium phosphate) from the resulting solution as gypsum by the addition of soluble sulphates (such as sodium sulphate) and by filtration. The calcium salt may, however, be allowed to remain in the solution, and be precipitated along with the cryolite by the addition of a corresponding amount of sodium-fluoride of hydrofluoric acid.

(b) Alternatively, the raw material is dissociated with silicon tetrafluoride in known manner, by passing that substance into an aqueous suspension of the phosphate. Aluminium fluoride, phosphoric acid and silica are formed. The solution containing the phosphoric acid and aluminium fluoride is separated from the silica by filtration, and, as hereinbefore described, is treated with the amount of sodium fluoride needed for the formation and precipitation of the aluminium-sodium fluoride; $AlF_3.3NaF$. The phosphoric acid can be separated as described in the preceding paragraph (a).

(c) If the raw material consists of pure aluminium phosphate, uncontaminated by silica or calcium compounds (e. g. in the form of minervite), the following procedure is suitable:

The phosphate is thoroughly mixed with such an amount of a sodium salt, for example sodium chloride as to make the proportions 12 or more molecules of NaCl to each molecule of $Al_2O_3$. A sufficient amount of dilute (e. g. 25%) hydrofluoric acid is added to bring the proportions to at least 12 molecules of HF to each molecule of alumina. This transforms the raw material into aluminium-sodium fluoride and phosphoric acid in accordance with the equation:

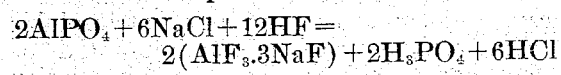

$$2AlPO_4 + 6NaCl + 12HF = 2(AlF_3.3NaF) + 2H_3PO_4 + 6HCl$$

The cryolite is filtered off from the phosphoric acid.

The phosphoric acid, or phosphate solution formed in the process can be treated, by known methods, for the production of concentrated phosphoric acid or phosphates, or double phosphates.

The precipitated aluminium-sodium fluoride can be employed as such—for example as a flux in the electrolytic production of aluminium, or in the production of opal—or enamel glass—or its constituents can be recovered in a usable form, as sodium aluminate and calcium fluoride, for example by double decomposition with calcium carbonate or oxide in the warm, according to known methods.

Alumina and sodium carbonate can be obtained from the resulting solution by the introduction of carbon dioxide. The calcium fluoride thus obtained, is transformed by silicon tetrafluoride and sodium chloride, into sodium silicofluoride, which is split up, by heating, into sodium fluoride—which can again be used for precipitating aluminium-sodium fluoride—and silicon tetrafluoride which can again be transformed into sodium silicofluoride with a fresh quantity of calcium fluoride and sodium chloride.

In operating by the method hereinbefore described in paragraph (b), the silicon tetrafluoride obtained in decomposing the sodium silicofluoride by heat, can be partly employed for the dissociation of the raw material, and the sodium fluoride can be used for the subsequent precipitation of aluminium-sodium fluoride. The surplus silicon tetrafluoride can again be transformed into sodium silicofluoride with calcium fluoride (from the dissociation of the cryolite) and sodium chloride.

In operating by the method described under (c), the hydrofluoric acid required for the dissociation can be prepared by decomposing, with sulphuric acid, the calcium fluoride obtained in the dissociation of the cryolite.

*Examples*

1. 1000 kgs. of a raw material containing 250 kgs. $Al_2O_3$ (as phosphate and silicate) and 300 kgs. of $P_2O_5$ (as aluminium- and calcium phosphates), together with 100 kgs. of CaO (as phosphate or carbonate), are dissociated with 890 kgs. of $H_2SO_4$ for example in the form of 50° Bé. acid. Leaching furnishes 3.5-4 cu. metres of a solution containing 230 kgs. of $Al_2O_3$ as sulphate, and 285 kgs. of $P_2O_5$ as phosphoric acid $(H_3PO_4)$. The insoluble residue (silica and calcium sulphate) is separated from the solution by known methods, such as filtration or decantation.

The solution is treated with 1200 kgs. of sodium fluoride, either in solid form or as (for example) a concentrated solution. There are formed 940 kgs. of cryolite, which can be very easily separated from the remaining solution, which latter retains 1025 kgs. of sodium sulphate, and 285 kgs. of $P_2O_5$ (as phosphoric acid).

The cryolite is used as such—with or without refining—or is treated for the recovery of alumina, fluor spar and sodium carbonate by known methods, for instance by means of calcium carbonate. In such case, 220 kgs. of $Al_2O_3$, 1035 kgs. of calcium fluoride and 715 kgs. of sodium carbonate are obtained.

The calcium fluoride is treated by known methods, for example for the recovery of sodium silicofluoride and sodium fluoride. In this manner it is possible to recover the whole of the fluorine introduced into the process as sodium fluoride.

The phosphoric acid solution may be employed, for example, for the production of phosphates or double superphosphate. In the former case, the whole of the phosphoric acid present can be transformed, in the solution itself, into primary sodium phosphate by slowly adding an amount of calcium carbonate equivalent to about one-third of the phosphoric acid present. In the first place a solution of monocalcium phosphate is obtained, from which the calcium is immediately precipitated as calcium sulphate, by reaction with the sodium sulphate present, the phosphoric acid remaining in solution as primary sodium phosphate.

In this manner, by adding 200 kgs. of calcium carbonate to the aforesaid solution, the phosphoric acid present can be transformed into 555 kgs. of monosodium phosphate ($NaH_2PO_4.H_2O$). The solution is freed from gypsum and concentrated, the sodium phosphate being recovered by crystallization.

2. 1000 kgs. of a raw material containing 250 kgs. of $Al_2O_3$, 300 kgs. of $P_2O_5$ and 100 kgs. of CaO are dissociated with 670 kgs. of hydro-chloric acid, for example in the form of an acid of 20° Bé. strength. Insoluble constituents (quartz and the like) remain behind, and 3.5–4 cu. metres of a solution are obtained containing 230 kgs. of $Al_2O_3$ (as aluminium chloride), 285 kgs. of $P_2O_5$ as $H_3PO_4$, and 190 kgs. of calcium chloride.

This solution is treated with an amount of a soluble sulphate (e. g. 245 kgs. of sodium sulphate) equivalent to the calcium chloride, thus precipitating the calcium as sulphate and leaving a corresponding amount (202 kgs.) of sodium chloride in the solution.

After separation from the gypsum and insoluble residue, this solution is treated with 1200 kgs. of sodium fluoride, in the solid form or as a concentrated solution. 940 kgs. of cryolite are precipitated and are separated from the solution. The precipitation is accelerated by the sodium chloride present. Remaining in the solution are 1025 kgs. of sodium sulphate, 202 kgs. of sodium chloride and 285 kgs. of $P_2O_5$ (equivalent to 394 kgs. of $H_3PO_4$).

The treatment of the solution on the one hand, and the cryolite on the other, is the same as described with reference to Example 1.

3. 1000 kgs. of a raw material containing 250 kgs. of $Al_2O_3$, 300 kgs. of $P_2O_5$ and 100 kgs. of CaO, are ground, and suspended in 2 cubic metres of water. 480 kgs. of gaseous $SiF_4$ (for example, from the dissociation gases of superphosphate manufacture) are passed through this suspension or the same amount is added in the form of a concentrated solution of hydrofluosilicic acid. A solution containing 432 kgs. of aluminium fluoride ($AlF_3$) and 290 kgs. of $P_2O_5$ (equal to 400 kgs. of $H_3PO_4$) is obtained and 139 kgs. of calcium fluoride and 285 kgs. of silica, from the decomposition of the $SiF_4$ or the $H_2SiF_6$ are left as insoluble residue.

The solution is filtered off from this residue, and from insoluble constituents (quartz and the like) of the raw material and is then treated with 650 kgs. of sodium fluoride, whereupon 1075 kgs. of cryolite are formed and are separated from the phosphoric acid solution.

This solution can be utilized for the production of phosphates or double superphosphate.

The cryolite is used as such or treated, for example, for transformation into alumina, sodium carbonate and calcium fluoride, in the manner hereinbefore described. In this manner, 255 kgs. of alumina, 800 kgs. of sodium carbonate and 1160 kgs. of calcium fluoride are obtained.

The calcium fluoride, together with the residue from the dissociation process—which contains 139 kgs. of calcium fluoride—is treated in known manner for the recovery of sodium silico-fluoride, which is then decomposed into silicon tetrafluoride and sodium fluoride. The former is employed for the dissociation of the raw material, and the latter for precipitating the cryolite from the solution.

In this manner, the fluorine is maintained in circulation.

4. The solution obtained by treating 1000 kgs. of raw material in the manner described with reference to Example 1 or 2, and containing (in 3.5 cubic metres) 230 kgs. of $Al_2O_3$ as sulphate or chloride, and 285 kgs. of $P_2O_5$ as $H_3PO_4$, is treated—when operating in accordance with Example 2—with 800 kgs. of sodium chloride, after removal of the calcium and after dilution, to 4 cubic metres for example, with water. Thereupon 500 kgs. of hydrofluoric acid are either passed through in the form of gas, or added as a preferably concentrated solution. A precipitate of aluminium-sodium fluoride is obtained, which is separated from the solution.

Phosphoric acid and the free acid of the aluminium salt (sulphuric acid or hydrochloric acid) remain in the solution. If the raw material be dissociated with sulphuric acid, then, in order to produce phosphates, these acids are neutralized in the solution with sodium carbonate, and the resulting sodium sulphate is transformed into primary sodium phosphate by the addition of calcium carbonate as described with reference to Example 1.

The cryolite is employed as described in Examples 1 to 3. If the cryolite be transformed into calcium fluoride, the hydrofluoric acid needed for the process can be obtained therefrom by treatment with sulphuric acid.

5. 1000 kgs. of a raw material, such as minervite, which is composed of aluminium phosphate, water, a little potassium phosphate and traces of ferric oxide, and contains 400 kgs. of $P_2O_5$, 210 kgs. of $Al_2O_3$ and 6.7 kgs. of $K_2O$, are thoroughly mixed with 750 kgs. of sodium chloride, 510 kgs. of hydrofluoric acid being then stirred-in, for example in the form of a 10-15% solution. The raw phosphate is transposed into 860 kgs. of cryolite and a solution which, after separation from the precipitate, contains 395 kgs. of $P_2O_5$, in the form of approximately 5% phosphoric acid, and 6.5 kgs. of $K_2O$ as fluoride.

The cryolite may, as already described, be treated by known methods for the recovery of alumina, sodium carbonate and calcium fluoride. This last substance serves afresh for the production of the hydrofluoric acid required for the process, this acid therefore remaining in circulation.

Claims:—

1. Process for the recovery of aluminium and phosphoric acid from a solution containing an aluminium salt and free phosphoric acid, consisting in transforming the aluminium into a sparingly soluble double fluoride, and separating the precipitated double fluoride from the solution containing the phosphoric acid.

2. Process for the recovery of aluminium and phosphoric acid from a solution containing an aluminium salt and free phosphoric acid consisting in transforming the aluminium into aluminium-sodium fluoride, and separating the precipitated double fluoride from the solution containing the phosphoric acid.

3. Process for the recovery of aluminium and phosphoric acid from a solution containing an aluminium salt and free phosphoric acid consisting in transforming the aluminium into aluminium-sodium fluoride, of the formula of cryolite ($AlF_3.3NaF$), and separating the precipitated double fluoride from the solution containing the phosphoric acid.

4. Process for the recovery of aluminium and phosphoric acid from a solution containing an aluminium salt and free phosphoric acid consisting in treating the solution with an amount of sodium fluoride which is at least sufficient to transform the whole of the aluminium into aluminium-sodium fluoride ($AlF_3.3NaF$), and separating the precipitated aluminium-sodium fluoride containing the whole of the aluminium from the solution containing the phosphoric acid.

5. Process for the recovery of aluminium and phosphoric acid from a solution containing an aluminium salt and free phosphoric acid consisting in treating the solution with amounts of sodium chloride and hydrofluoric acid that are at least sufficient to transform the whole of the aluminium into aluminium-sodium fluoride ($AlF_3.3NaF$), and separating the precipitated aluminium-sodium fluoride from the solution containing the phosphoric acid.

6. Process for the recovery of aluminium and phosphoric acid from a solution containing an aluminium salt, hydrofluoric acid and free phosphoric acid consisting in treating the solution with an amount of sodium fluoride that is at least sufficient to transform the whole of the aluminium into aluminium-sodium fluoride ($AlF_3.3NaF$), and separating the precipitated aluminium-sodium fluoride from the solution containing the phosphoric acid.

7. Process for the recovery of aluminium and phosphoric acid from a solution containing an aluminium salt, hydrofluoric acid and free phosphoric acid consisting in treating the solution with amounts of sodium chloride and hydrofluoric acid that are at least sufficient to transform the whole of the aluminium into aluminium-sodium fluoride ($AlF_3.3NaF$) and separating the precipitated aluminium-sodium fluoride from the solution containing the phosphoric acid.

8. Process for the recovery of aluminium and phosphoric acid from a solution containing an aluminium salt and free phosphoric acid consisting in dissociating native raw phosphate containing aluminium, calcium and phosphoric acid with hydrochloric acid, precipitating the calcium as sulphate, from the resulting solution containing aluminium chloride and calcium chloride, by means of a soluble sulphate separating said calcium sulphate from the solution, treating the resulting solution with an amount of sodium fluoride that is at least sufficient to transform the whole of the aluminium into aluminium-sodium fluoride ($AlF_3.3NaF$) and separating the precipitated aluminium-sodium fluoride from the solution containing the phosphoric acid.

9. Process for the recovery of aluminium and phosphoric acid from a solution containing an aluminium salt, hydrofluoric acid and free phosphoric acid consisting in dissociating a native raw phosphate chiefly containing aluminium phosphate, calcium phosphate and aluminous materials, in aqueous suspension, by the introduction of silicon tetrafluoride; treating the resulting solution, containing aluminium fluoride and phosphoric acid, after separation from the residue, with an amount of sodium fluoride that is at least sufficient to precipitate the whole of the aluminium as aluminium-sodium fluoride ($AlF_3.3NaF$), separating the precipitated aluminium-sodium fluoride from the solution containing the phosphoric acid and subjecting same to further treatment; whilst splitting off from the residue obtained by the dissociation of the phosphate and consisting substantially of calcium fluoride and silica, the fluorine in the form of silicon tetrafluoride, separating said silicon tetrafluoride from the residue containing calcium, and using same over again in the process.

10. Process for the recovery of aluminium and phosphoric acid from a solution containing an aluminium salt and free phosphoric acid consisting in treating a solution obtained by dissociating native aluminiferous raw phosphate with an acid dissociating agent, with an amount of sodium fluoride that is at least sufficient to transform the whole of the aluminium into aluminium-sodium fluoride ($AlF_3.3NaF$), and separating the precipitated aluminium-sodium fluoride from the solution containing the phosphoric acid.

11. Process for the recovery of aluminium and phosphoric acid from a solution containing an aluminium salt and free phosphoric acid consisting in treating a solution obtained by dissociating native aluminiferous raw phosphate with an acid dissociating agent, with an amount of a sodium salt and of hydrofluoric acid, at least sufficient to transform the whole of the aluminium in solution into aluminium-sodium fluoride ($AlF_3.3NaF$), and separating the precipitated aluminium-sodium fluoride from the solution containing the phosphoric acid.

12. Process for the recovery of aluminium and phosphoric acid from a solution containing an aluminium salt and free phosphoric acid consisting in treating a solution obtained by dissociating native aluminiferous raw phosphate with an acid dissociating agent, with amounts of sodium chloride and of hydrofluoric acid, at least sufficient to transform the whole of the aluminium in solution into aluminium-sodium fluoride ($AlF_3.3NaF$), and separating the precipitated aluminium-sodium fluoride from the solution containing the phosphoric acid.

13. Process for the recovery of aluminium and phosphoric acid from a solution containing an aluminium salt and free phosphoric acid consisting in treating a solution obtained by dissociating native aluminiferous raw phosphate with a mineral acid, with an amount of sodium fluoride at least sufficient to transform the whole of the aluminium in solution into aluminium-sodium fluoride ($AlF_3.3NaF$), and separating the precipitated aluminium-sodium fluoride from the solution containing the phosphoric acid.

14. Process for the recovery of aluminium and phosphoric acid from a solution containing an aluminium salt and free phosphoric acid consisting in treating a solution obtained by dissociating native aluminiferous raw phosphate with a mineral acid, with amounts of a sodium salt and hydrofluoric acid at least sufficient to transform the whole of the aluminium in solution into aluminium-sodium fluoride ($AlF_3.3NaF$), and separating the precipitated aluminium-sodium fluoride from the solution containing the phosphoric acid.

15. Process for the recovery of aluminium and phosphoric acid from a solution containing an aluminium salt and free phosphoric acid consisting in treating a solution obtained by dissociating native aluminiferous raw phosphate with a mineral acid, with amounts of sodium chloride and hydrofluoric acid at least sufficient to transform the whole of the aluminium in solution into aluminium-sodium fluoride ($AlF_3.3NaF$), and separating the precipitated aluminium-sodium fluoride from the solution containing the phosphoric acid.

16. Process for the recovery of aluminium and phosphoric acid from a solution containing an aluminium salt and free phosphoric acid consisting in treating a solution obtained by dissociating native aluminiferous raw phosphate with sulphuric acid, with an amount of sodium fluoride at least sufficient to transform the whole of the aluminium in solution into aluminium-sodium fluoride ($AlF_3.3NaF$), and separating the precipitated aluminium-sodium fluoride from the solution containing the phosphoric acid.

17. Process for the recovery of aluminium and phosphoric acid from a solution containing an aluminium salt and free phosphoric acid consisting in treating a solution obtained by dissociating native aluminiferous raw phosphate with sulphuric acid, with amounts of a sodium salt and hydrofluoric acid at least sufficient to transform the whole of the aluminium in solution into aluminium-sodium fluoride ($AlF_3.3NaF$), and separating the precipitated aluminium-sodium fluoride from the solution containing the phosphoric acid.

18. Process for the recovery of aluminium and phosphoric acid from a solution containing an aluminium salt and free phosphoric acid consisting in treating a solution obtained by dissociating native aluminiferous raw phosphate with sulphuric acid, with amounts of sodium chloride and hydrofluoric acid, at least sufficient to transform the whole of the aluminium in solution into aluminium-sodium fluoride ($AlF_3.3NaF$), and separating the precipitated aluminium-sodium fluoride from the solution containing the phosphoric acid.

19. Process for the recovery of aluminium and phosphoric acid from a solution containing an aluminium salt and free phosphoric acid, consisting in treating the solution with amounts of a sodium salt and hydrofluoric acid that are at least sufficient to transform the whole of the aluminium into aluminium-sodium fluoride.

20. Process for the recovery of aluminium and phosphoric acid from a solution containing an aluminium salt, hydrofluoric acid and free phosphoric acid consisting in treating the solution with amounts of a sodium salt and hydrofluoric acid that are at least sufficient to transform the whole of the aluminium into aluminium-sodium fluoride ($AlF_3.3NaF$) and separating the precipitated aluminium-sodium fluoride from the solution containing the phosphoric acid.

In testimony whereof I affix my signature.

HANS LEHRECKE.